United States Patent [19]
Kato

[11] 3,744,183
[45] July 10, 1973

[54] METHOD OF HYDROPONIC CULTIVATION

[76] Inventor: Naoe Kato, Midorigaoka 1-chome 25-ban 18-go, 386 Nagano-ken, Ueda-shi, Japan

[22] Filed: Dec. 3, 1971

[21] Appl. No.: 204,449

[30] Foreign Application Priority Data
Dec. 11, 1970  Japan............................ 45/110724
Dec. 11, 1970  Japan............................ 45/124134
Dec. 11, 1970  Japan............................ 45/124136
Dec. 11, 1970  Japan............................ 45/124137
Dec. 11, 1970  Japan............................ 45/124138

[52] U.S. Cl. ................................................. 47/1.2
[51] Int. Cl. ............................................ A01g 31/02
[58] Field of Search ..................... 47/1.2, 38, 38.1, 47/37, 14, 16

[56] References Cited
UNITED STATES PATENTS

| | | | |
|---|---|---|---|
| 2,026,322 | 12/1935 | Raines | 47/38 |
| 2,189,510 | 2/1940 | Swaney | 47/1.2 |
| 3,177,616 | 4/1965 | Sawyer | 47/1.2 |
| 3,241,264 | 3/1966 | Porter et al. | 47/38.1 |
| 3,352,057 | 11/1967 | Ferrand | 47/1.2 |

*Primary Examiner*—Robert E. Bagwill
*Attorney*—Edwin E. Greigg

[57] ABSTRACT

A method of hydroponic cultivation of plants, comprising holding a plant in a suspended state, establishing contact between the root of the plant and a carrier member for flowing down nutrient solution disposed outwardly of the root, feeding nutrient solution from above the corner member to flow down therealong so that the nutrient solution may be fed to the root without immersing the root in the nutrient solution to establish constant and satisfactory contact between the root and air, thereby accomplishing a satisfactory cultivation free from the decay and undergrowth of the root.

13 Claims, 3 Drawing Figures

PATENTED JUL 10 1973

3,744,183

METHOD OF HYDROPONIC CULTIVATION

BACKGROUND OF THE INVENTION

Conventionally, the hydroponic cultivation of plants is effected by constantly immersing the root of a plant in nutrient solution or permitting the root to grow in gravel, sand or the like by intermittently feeding nutrient solution so that the nutrient solution retained in the interstices of gravel, sand or the like may be absorbed by the root.

In the former case, since the root is constantly positioned in the nutrient solution, there is the shortage of oxygen supply to the root and the root is overfed with water, causing the decay or undergrowth of the root. Therefore, it has been impossible to achieve a satisfactory growth of plants.

In the latter case, if the interstices are made narrow enough to retain a sufficient amount of nutrient solution, this results in a failure to feed the root with sufficient oxygen. On the contrary, if the interstices are made wide enough to feed the root with sufficient oxygen, this results in the shortage of nutrient solution supply to the root. Thus it is very difficult to control the state of the gravel or sand to obtain a desired size of interstices. Actually, it has been impossible to achieve a satisfactory growth of the root by controlling the interstices. Further, in order to feed nutrient solution intermittently, it is necessary either to arrange the apparatus so as to effect automatic feeding of the nutrient solution at predetermined intervals of time or to feed it manually. In the former case, the apparatus itself is complicate and expensive. In the latter case, much labor is required for maintenance. In either case, it is very difficult to determine the time intervals for supply of nutrient solution.

As a result of our extensive researches, we have devised a method of hydroponic cultivation of plants enabling the aforesaid problems to be solved all at once.

SUMMARY OF THE INVENTION

The present invention relates to a convenient method of hydroponic cultivation which, in reliably feeding the root of a plant with sufficient amounts of nutrient solution and oxygen to achieve satisfactory growth of the root of the plant by hydroponic cultivation, is made of a simple apparatus which requires less labor for maintenance.

The present method comprises suspending a plant at the root collar thereof by means of a sponge or the like, positioning the root of the plant in the air so as not to prevent the growth of the plant, and constantly establishing contact between the root and fresh air. It further comprises installing a carrier member capable of retaining nutrient solution, such as a woven fabric or a water-permeable sheet positioned on both sides of the root and extending vertically and horizontally for a suitable distance, contacting the root with the carrier member, feeding nutrient solution from above the carrier member to permit it to flow down along the carrier member, permitting the root to absorb the nutrient solution retained by the carrier member, thereby effecting the necessary and sufficient feeding of nutrient solution to the root.

In this manner since the necessary and sufficient feeding of nutrient solution and sufficient feeding of oxygen can be easily and reliably effected, root decay and undergrowth due to excessive moisture and shortage of oxygen can be positively prevented, so that satisfactory growth of plants by hydroponic cultivation can be achieved.

If the carrier member for feeding the root with nutrient solution has a suitable water retaining property, simply contacting the root with such a carrier member is enough to insure the reliable feeding of sufficient nutrient solution so that oxygen and the apparatus is not only simple in construction but also exhibits ease in handling.

Even if nutrient solution is continuously fed, the feeding of oxygen to the root can be reliably effected. Therefore, unlike the system in which such nutrient solution is fed intermittently, there is no need to provide a complicated apparatus which makes it possible to automatically determine the feed time. Further, even in the case of manually effecting the intermittent feeding of nutrient solution, since it is only necessary to effect such feeding of nutrient solution at intervals of time determined by the water retaining property of the carrier member, it is possible to effect the feeding of nutrient solution without fail in accord with the characteristics of the apparatus and there is no possibility of a shortage of supply of nutrient solution occurring unexpectedly.

An object of the present invention is to provide a method of hydroponic cultivation whereby satisfactory hydroponic is achieved by feeding the root of a plant with sufficient amounts of nutrient solution and oxygen method can be practised using a simple apparatus which requires little maintenance.

More particularly, it is an object of the invention to provide a method of hydroponic cultivation which makes it possible to simplify the means for feeding nutrient solution and easily and reliably to create conditions suitable for the growth of plants.

A further object is to provide a method of hydroponic cultivation which can be carried out in such a condition that in order to repeatedly use the apparatus by removing the plants such removal can be easily effected without leaving the roots behind.

BRIEF DESCRIPTION OF THE DRAWING

The drawing illustrates by way of example an apparatus for hydroponic cultivation used in embodying the present method. In the drawing.

DESCRIPTION OF THE PREFERRED EMBODIMENT

Figure 1:
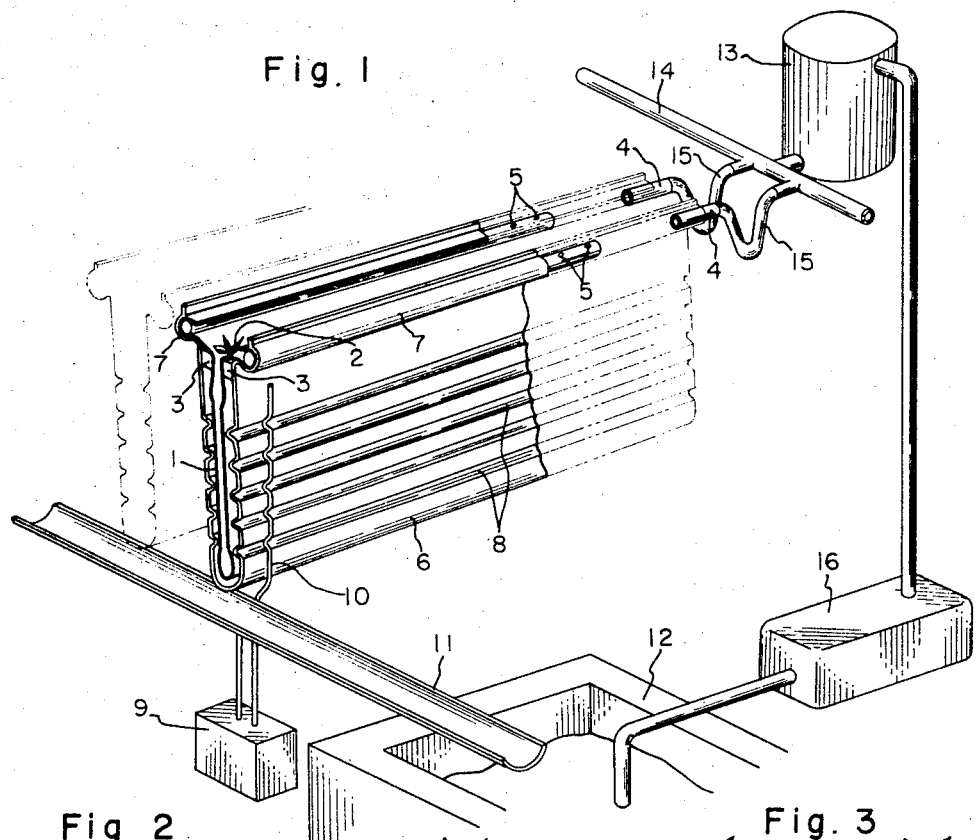
FIG. 1 is a fragmentary perspective view.

A preferred embodiment of the method of hydroponic cultivation according to the present invention will now be described with reference to the drawing shown by way of example.

Referring to FIG. 1, the numeral 1 denotes a carrier member capable of retaining nutrient solution, which carrier member is bent substantially in U-shape to form two substantially parallel plane opposed inner surfaces and suspended. The carrier member 1 is constructed of a water-permeable sheet such as woven fabric or paper or of a water-impermeable sheet bored with fine holes. Further, such sheets may be napped on the sheet surface. If necessary, a surface active agent may be applied to the carrier member 1 to promote the wettability of the carrier member 1 with respect to nutrient solution. Further, if necessary, the surface of the carrier member 1 is made dense to prevent the entry of the root of a plant, thereby to permit the removal of plants 2 without leaving the roots behind. The carrier member 1 extends vertically over a suitable distance so as not to obstruct to the growth of the plants 2.

The above-mentioned plants 2 are held between sponges 3 at their root collars and are suspended therefrom. The roots of the plants 2 are in contact with said carrier member 1 and positioned so that they are also in contact with air to ensure a sufficient supply of oxygen. Various means may be employed to hold the plants 2 with their roots in contact with the carrier member 1, and conveniently such menas will deform as the plants 2 grow, as in the case of sponges.

The reference numeral 4 denotes a pipe, provided with a number of holes 5 which are longitudinally arranged so that nutrient solution flowing out through the holes 5 is supplied to the carrier member 1 from above. The nutrient solution flows down along the carrier member 1, during which it is retained over the entire surface of the carrier member 1 to permit the roots of the plants 2 to absorb the nutrient solution from the carrier member 1. Therefore, the roots do not become immersed in the nutrient solution and hence excessive moistening of the roots is prevented.

The reference numeral 6 denotes a deformable elastic supporting body or shaped plate member which is bent substantially in U-shape to form two surfaces facing toward each other and, which has at the top thereof a gutter-like projection 7 outwardly extending from both lateral surfaces thereof. The pipes 4 are respectively fitted in the projections 7 and thereby held therein and the pipes 5 cooperate with the plate 6 to hold the carrier member 1 between the plane surfaces thereof. The holes 5 in the two pipes 4 are opposed to the inner surfaces of the projections 7 and covered with portions of the carrier member 1, so that the nutrient solution flows down uniformly over the entire surface of the carrier member 1. For uniformly supplying the carrier member 1 with the nutrient solution, instead of the pipes 4 it is possible to use the projections 7 as gutters, or utilize other means. The two pipes 4 are placed with a sufficiently large spacing therebetween to facilitate the mounting and dismounting of the plants 2 with respect to the sponges 3.

Both lateral surfaces of the plate member 6 are provided with receiving portions 8 arranged in a plurality of rows, and pillars 10 erected on support blocks 9 are provided with projections adapted to be resiliently fitted in said receiving portions 8. The plate member 6 is held between the pillars 10, so that it is vertically adjustable.

Figure 2:
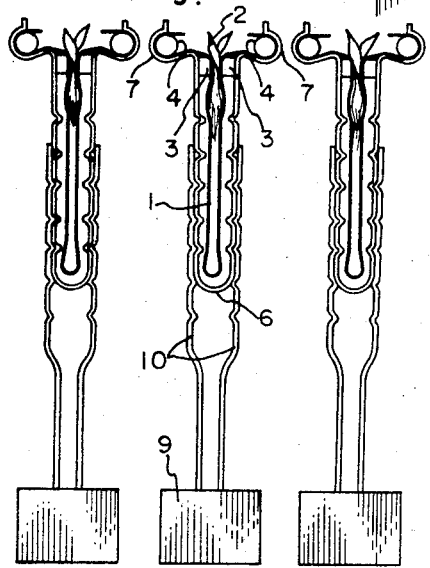
FIG. 2 is a side view of such apparatus consisting of three units, showing the early stage of cultivation of plants.
Figure 3:
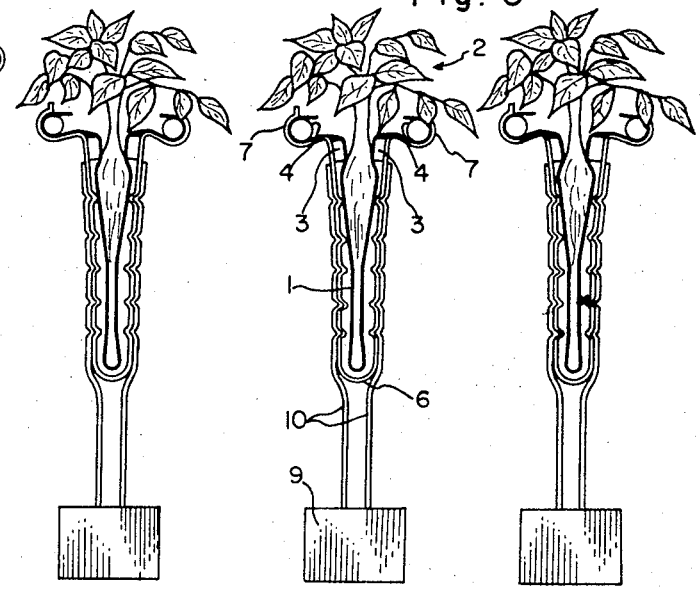
FIG. 3 is a side view similar to FIG. 2, but showing the plants in the full stage of cultivation.

A plurality of plate members 6 mounted on their separate blocks 9 are arranged side by side with their spacings variable. Thus, in the early stage of cultivation as shown in FIG. 2, the plate members 6 are increased in height and decreased in spacing to provide for easy viewing of the plants 2 and to decrease the floor space required. As shown in FIG. 3, as the plants 2 grow, the vertical position of the plate member 6 will decrease in their and the spacing between the opposed inner surfaces thereof will increase to provide for easy accommodating of the plants 2 and to ensure appropriate ventilation and ample sunshine.

Such a plate member 6 is capable of elastic deformation in such a manner that the two pipes 4 move away from each other. Thus, as shown in FIG. 3, it can be forced apart as the roots grow, which means that the apparatus is effective even in the case in which the growth of the root is of utmost importance, such as a radish.

The bent portion of the plate member 6 is positioned downwardly and inclined bodies 6 are laterally inclined, so that the nutrient solution flowing down along the carrier member 1 is received on the bent lowermost portion of the plate member 6 and is then recovered by a storage tank 12 from all of the plates 6 via an inclined guide gutter 11. Other various means may be employed for recovering the nutrient solution.

A pipe 14 and relatively long flexible pipes 15 establish communication between the pipes 4 of the plate members 6 and an upper tank 13, and a drive-equipped liquid-lifting pump 16 lifts the nutrient solution from the storage tank 12 to pour it into the upper tank 13, thus constituting means for circulating the nutrient solution for re-cycling. Therefore, it is possible to reliably carry out satisfactory cultivation of plants by making effective use of a small amount of nutrient solution and to avoid the decay of the roots by preventing the roots from being immersed in the nutrient solution.

That which is claimed is:

1. A method of hydroponic cultivation comprising the steps of:

a. suspending at least one carrier member having two substantially parallel spaced apart inner surfaces facing each other in a space where air is freely ventilated by holding the uppermost portion of the at least one carrier member in the vicinity of the two inner surfaces of the at least one carrier member;

b. placing root collar and root of at least one plant between the two inner surfaces of the at least one carrier member;

c. holding the root collar between the two inner surfaces of the at least one carrier member by forces resiliently applied from opposite directions to the root collar while allowing the root to be substantially free of holding forces so as to suspend the at least one plant;

d. feeding fluid containing nutrient material to the at least one carrier member to flow down along each of the two inner surfaces of the at least one carrier member;

e. supplying the nutrient material from the fluid to the at least one plant by allowing the root of the at least one plant to contact freely the two inner surfaces of the at least one carrier member to absorb nutriment;

f. supplying oxygen from air, which ventilates space between the two inner surfaces of the at least one carrier member, to the root of the at least one plant; and g. expanding the space between the two inner surfaces of the at least one carrier member by forces resulting from growth of the root collar of the at least one plant.

2. A method of hydroponic cultivation as set forth in claim 1, comprising the further step of providing a deformable supporting body in contact with outer surfaces of the at least one carrier member.

3. A method of hydroponic cultivation as set forth in claim 2, wherein the step of holding the root collar includes placing a sponge between upper portions of inner surfaces of the deformable supporting body and portions of outer surfaces of the at least one carrier member in close vicinity to the root collar.

4. A method of hydroponic cultivation as set forth in claim 1, comprising the further steps of collecting and re-cycling the nutrient containing fluid which flows down the inner surfaces of the at least one carrier member.

5. A method of hydroponic cultivation as set forth in claim 1, including providing the at least one carrier member in the form of a woven fabric.

6. A method of hydroponic cultivation as set forth in claim 1, including providing the at least one carrier member in the form of a water-permeable sheet.

7. A method of hydroponic cultivation as set forth in claim 1, including providing the at least one carrier member in the form of a water-impermeable sheet having a napped surface.

8. A method of hydroponic cultivation as set forth in claim 1, including providing the at least one carrier member in the form of a sheet having a plurality of openings sufficiently small to prevent the entry of the root of the at least one plant thereinto.

9. A method of hydroponic cultivation as set forth in claim 1, including providing the at least one carrier member in the form of a sheet having a surface active wetting agent applied thereto.

10. A method of hydroponic cultivation as set forth in claim 1, including providing the at least one carrier member in the form of a sheet bent substantially in U-shape to provide the two substantially parallel inner surfaces.

11. A method of hydroponic cultivation as set forth in claim 10, including positioning the bent portion of the sheet lowermost, and wherein the step of holding the root collar includes positioning respectively separate sponges against outer surfaces of the sheet in the vicinity of its uppermost portions.

12. A method of hydroponic cultivation as set forth in claim 1, further comprising the steps of arranging a plurality of the carrier members in spaced relationship in a substantially horizontal direction, holding at least one plant in each of the carrier members, lowering the carrier members as the plants grow, and increasing the spacing between the carrier members as the plants grow.

13. A method of hydroponic cultivation as set forth in claim 1, further comprising the steps of collecting the fluid containing the nutrient material fed to the at least one carrier member, lifting the collected fluid in a driven pump, and feeding the lifted fluid again to the at least one carrier member.

* * * * *

UNITED STATES PATENT OFFICE
CERTIFICATE OF CORRECTION

Patent No. 3,744,183　　　　　　　Dated July 10, 1973

Inventor(s) Naoe Kato

It is certified that error appears in the above-identified patent and that said Letters Patent are hereby corrected as shown below:

Abstract, line 6, "corner" should read --carrier--

Col. 2, line 8, "so that oxygen and" should read --and oxygen so that--

"　　" line 27, after "hydroponic" insert --cultivation-- line 28, after "oxygen" insert a period (.)

line 29, before "method" insert --The--

Col. 3, line 8, delete "to" (second occurrence)

"　　" line 16, "menas" should read --means--

"　　" lines 5 and 4 from bottom, delete "in their"

Col. 4, lines 9 and 10, delete "bodies 6 are laterally inclined"

"　　" line 22, "re-cycting" should read --re-cycling--

Signed and sealed this 6th day of August 1974.

(SEAL)
Attest:

McCOY M. GIBSON, JR.　　　　　　　C. MARSHALL DANN
Attesting Officer　　　　　　　　　Commissioner of Patents